US008561385B2

(12) United States Patent
Ciezki et al.

(10) Patent No.: US 8,561,385 B2
(45) Date of Patent: Oct. 22, 2013

(54) FLYING OBJECT

(75) Inventors: Helmut Ciezki, Neckarsulm (DE); Ralf Stark, Widdern (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 409 days.

(21) Appl. No.: 12/903,504

(22) Filed: Oct. 13, 2010

(65) Prior Publication Data

US 2011/0083418 A1 Apr. 14, 2011

Related U.S. Application Data

(63) Continuation of application No. PCT/EP2009/054758, filed on Apr. 21, 2009.

(30) Foreign Application Priority Data

Apr. 25, 2008 (DE) .......................... 10 2008 022 289

(51) Int. Cl.
*F02K 1/00* (2006.01)
(52) U.S. Cl.
USPC ............................................. 60/230; 60/770
(58) Field of Classification Search
USPC .......... 60/230, 232, 770; 239/265.11, 265.19, 239/265.23, 265.39
See application file for complete search history.

(56) References Cited

U.S. PATENT DOCUMENTS

| 3,113,429 | A | * | 12/1963 | Davies ............................ 60/230 |
| 3,246,468 | A | | 4/1966 | Wilhite |
| 3,570,247 | A | | 3/1971 | Denning et al. |
| 3,693,880 | A | * | 9/1972 | Versaw et al. ............... 239/127.3 |
| 3,791,586 | A | * | 2/1974 | Moorehead ............... 239/265.29 |
| 3,940,067 | A | * | 2/1976 | Cherry et al. ............ 239/265.11 |
| 3,970,252 | A | * | 7/1976 | Smale et al. ............... 239/127.3 |
| 4,627,586 | A | | 12/1986 | Krumins et al. |
| 5,078,336 | A | | 1/1992 | Carter |
| 5,184,459 | A | * | 2/1993 | McAndrews ................ 60/226.3 |

(Continued)

FOREIGN PATENT DOCUMENTS

| DE | 11 32 804 B | 1/1963 |
| DE | 102004037487 | 3/2006 |

(Continued)

OTHER PUBLICATIONS

Hagemann et al., "Nozzle Flowfield Analysis with Particular Regard to 3D-Plug Cluster Configurations," *American Institute of Aeronautics and Astronautics, Inc.*, 1996, 1-16.

(Continued)

*Primary Examiner* — Phutthiwat Wongwian
(74) *Attorney, Agent, or Firm* — Womble Carlyle Sandridge & Rice, LLP

(57) ABSTRACT

A flying object is provided with an engine comprising a combustion chamber with a combustion space and a nozzle with a nozzle space following the combustion chamber, the transition between combustion chamber and nozzle lying in a plane in which a cross-section of the combustion space converges, in which thrust control in terms of magnitude and/or thrust vector can be carried out in a simple manner, it is provided that a centre body adapted to have combustion products flowing around it is at least partially arranged in the nozzle space, outside of the combustion space, and at least three jet vanes are arranged at the centre body.

16 Claims, 4 Drawing Sheets

(56) References Cited

U.S. PATENT DOCUMENTS

| | | | |
|---|---|---|---|
| 6,619,031 B1* | 9/2003 | Balepin | 60/246 |
| 7,155,898 B2 | 1/2007 | Sota, Jr. et al. | |
| 2007/0095972 A1 | 5/2007 | Buffenoir et al. | |
| 2007/0119151 A1 | 5/2007 | McAllister et al. | |
| 2007/0166525 A1* | 7/2007 | Nakamura | 428/293.1 |

FOREIGN PATENT DOCUMENTS

| | | |
|---|---|---|
| GB | 2 068 311 | 8/1981 |
| WO | WO 2005/028844 | 3/2005 |
| WO | WO 2006/028516 | 3/2006 |

OTHER PUBLICATIONS

Hagemann et al., "Advanced Rocket Nozzles," *Journal of Propulsion and Power*, 1998, pp. 620-634, vol. 14, No. 5.

Ørbekk, "Novel TVC System Utilizing Guide Vanes with Jet Flap's into a High Efficiency Compact Nozzle," *41st AIAA/ASME/SAE/ASEE Joint Propulsion Conference & Exhibit*, 2005, pp. 1-13, Tucson, Arizona.

Rommel et al., "Plug Nozzle Flowfield Calculations for SSTO Applications," *31st AIAA/ASME/SAE/ASEE Joint Propulsion Conference & Exhibit*, 1995, pp. 1-9, San Diego, California.

Rommel et al., "Plug Nozzle Flowfield Analysis," *Journal of Propulsion and Power*, 1997, pp. 629-634, vol. 13, No. 5.

\* cited by examiner

FLYING OBJECT

This application is a continuation of international application number PCT/EP2009/054758 filed on Apr. 21, 2009. The present disclosure claims priority to and the benefit of International Patent Application Number PCT/EP2009/054758, filed Apr. 21, 2009, and German Patent Application Number 10 2008 022 289.5, filed Apr. 25, 2008, both of which are incorporated herein by reference in their entirety and for all purposes.

BACKGROUND OF THE INVENTION

The invention relates to a flying object with an engine comprising a combustion chamber with a combustion space and a nozzle with a nozzle space following the combustion chamber, the transition between combustion chamber and nozzle lying in a plane in which a cross-section of the combustion space converges.

A rocket engine comprising guide vanes that protrude into the combustion chamber is known from WO 2005/028844 A1.

A yaw control device for an aircraft provided with a supersonic nozzle having a rectangular or flat cross-section is known from DE 10 2006 031 625 A1. The device comprises at least one jet vane in the form of an aileron inside of a nozzle tube, the vane being movable about a pivot axis.

Jet vanes for use in hot gas flows are known from DE 10 2004 037 487 A1.

WO 2006/028516 A2 and U.S. Pat. No. 7,155,898 B2 disclose a thrust vector control system for a rocket with a plug nozzle comprising a housing having a nozzle throat, a plug positioned relative to the housing and positioned within the nozzle throat, thereby defining a space between the plug and the nozzle throat, and having a thrust diverter movably arranged relative to the housing to provide an asymmetric surface pressure distribution along the plug.

SUMMARY OF THE INVENTION

In accordance with the present invention, a flying object is provided, in which thrust control in terms of magnitude and/or thrust vector can be carried out in a simple manner.

In accordance with an embodiment of the invention, a centre body around which combustion products can flow is at least partially arranged in the nozzle space, outside of the combustion space, and at least three jet vanes are arranged at the centre body.

The at least three jet vanes serve to influence the hot gas flow of the combustion products. By providing at least three jet vanes, thrust vector control can be achieved with respect to yaw, roll and pitch.

By positioning the jet vanes at the (single) centre body, which has combustion products flowing around it, an optimized influence on the thrust vector can be obtained.

The centre body and hence also the jet vanes are arranged outside of the combustion space. In particular, this allows the jet vanes to be arranged in the region where the impulse is at its maximum in order to obtain an optimized influence.

Furthermore, this provides the possibility of implementing a pressure ratio adaptivity relative to the pressure ratio of combustion chamber pressure to external pressure. By the outflow of combustion product exhaust gases, a media boundary is created between this exhaust gas flow and an external flow around the flying object. With adaptation of the pressure ratio mentioned, steady flow around the jet vanes can be achieved in the entire pressure ratio range. For example, at high pressure ratios corresponding to a high flight altitude, thrust control can take place by exhaust gas jet steering, and at small values of the pressure ratio (for example, corresponding to a low flight altitude), aerodynamic steering can be achieved.

In particular, the nozzle can then be implemented as a plug nozzle.

An optimized impulse gain can thereby be achieved. For example, a high start thrust can be achieved. In particular, altitude adaptation relative to the flight altitude is possible.

Arranging the jet vanes at the centre body also results in extensive possibilities of influence for the jet vanes.

In particular, the nozzle with centre body is a pressure ratio-adaptive nozzle with respect to the ratio of combustion chamber pressure to external pressure. For example, the external pressure decreases with flight altitude. By using a pressure ratio-adaptive nozzle, an optimized thrust can be achieved at different flight altitudes.

In an advantageous embodiment, the nozzle with centre body is configured as a plug nozzle. Plug nozzles are described, for example, in the article "Advanced Rocket Nozzles" by G. Hagemann et al. in Journal of Propulsion and Power, Vol. 14, No. 5, September-October 1998, pages 620-634, which is incorporated herein and made a part hereof by reference. By using a plug nozzle, high specific impulses can be obtained, particularly in the lower pressure ratio range (of the pressure ratio of combustion chamber pressure to external pressure). Even in this range, good control properties are obtained.

In an embodiment, at least one of the at least three jet vanes is mounted for pivotal movement at the centre body. This results in further control possibilities by adjusting a specific pivoted position.

In particular, a drive device for a pivotal movement is positioned at the centre body. The drive device is thereby protected from the hot gas flow of the combustion products (exhaust gas flow). The drive device is preferably configured such that a specific pivoted position can be secured.

It is particularly advantageous for at least one of the at least three jet vanes to be connected with an aerodynamic vane. A jet vane is effective within the media boundary between the hot gas flow of the combustion products and the air flow around the flying object. An aerodynamic vane protrudes into the region of the air flow around the flying object. An aerodynamic attitude control can thereby be carried out. A corresponding jet vane/aerodynamic vane combination can influence both the hot gas flow and the air flow around the flying object. By a pressure variation in the ratio of combustion chamber pressure to external pressure, the position of the media boundary between the hot gas flow of the combustion products and the external flow is shifted. The influence range of the control by jet vane and aerodynamic vane can thereby also be shifted. An adaptive directional control is thereby obtained.

In particular, the aerodynamic vane and the jet vane connected therewith are combined to form a unit.

It can, in principle, be provided that the associated aerodynamic vane is pivotable relative to the at least one jet vane. This results in further control possibilities. In principle, it is also conceivable that, for example, the aerodynamic vane is slidable relative to the associated jet vane in order to thus obtain further control possibilities.

In an exemplary embodiment, a gear device is provided for the relative pivotability of the at least one jet vane and the aerodynamic vane connected therewith. For example, a corresponding drive device which acts upon both the jet vane and the aerodynamic vane is arranged in the centre body, a different pivot angle being adjustable via the gear device.

In an exemplary embodiment, at least one holding bridge is provided via which the centre body is held at a holding structure. Preferably, the holding bridge is arranged such that its influence on the hot gas flow of the combustion products is minimal.

It is then beneficial for one or more conduits or lines leading to the centre body to be arranged at the at least one holding bridge. The conduits/lines can be electrical lines such as supply lines and signal lines. Alternatively or additionally, medium conduits can be provided. The conduits/lines can be arranged at the at least one holding bridge in a protected manner.

In an exemplary embodiment, a sensor device is arranged at the centre body. In particular, the sensor device is an optical sensor device. For example, it can sense exhaust gas properties (including flow properties), and the corresponding sensor data can be used for thrust control (with respect to the magnitude of the thrust and/or the position of the thrust vector). The sensor device can, for example, alternatively or additionally also be configured as a receiver which serves communication purposes. For example, the receiver is configured as an infrared receiver or laser receiver which can receive communication signals, for example from a land- or sea-based ground station or from an aircraft.

It is beneficial for the sensor device to be arranged in a rear portion of the centre body. This enables, for example, properties of the exhaust gas to be determined even in an optically thin exhaust gas jet. For example, a roll attitude-independent exhaust gas layer thickness can thereby be determined.

In an exemplary embodiment, at least one of the at least three jet vanes is foldably or slidably arranged at the centre body. This allows the space requirement of the flying object in the region of the jet vanes to be minimized, so as to enable, for example, adaptation to the space requirement of a launch container.

In particular, the at least three jet vanes are arranged at the side or at the rear of the centre body. Preferably, they are arranged in a flow region where the impulse of the combustion products is at its highest.

It is particularly advantageous for the jet vanes to be at least partially made of a carbide ceramic material. High hot gas resistance and abrasion resistance can thereby be achieved. In this connection, reference is made to DE 10 2004 037 487 A1.

The following description of preferred embodiments serves to explain the invention further in conjunction with the drawings.

DETAILED DESCRIPTION OF THE INVENTION

Figure 1:
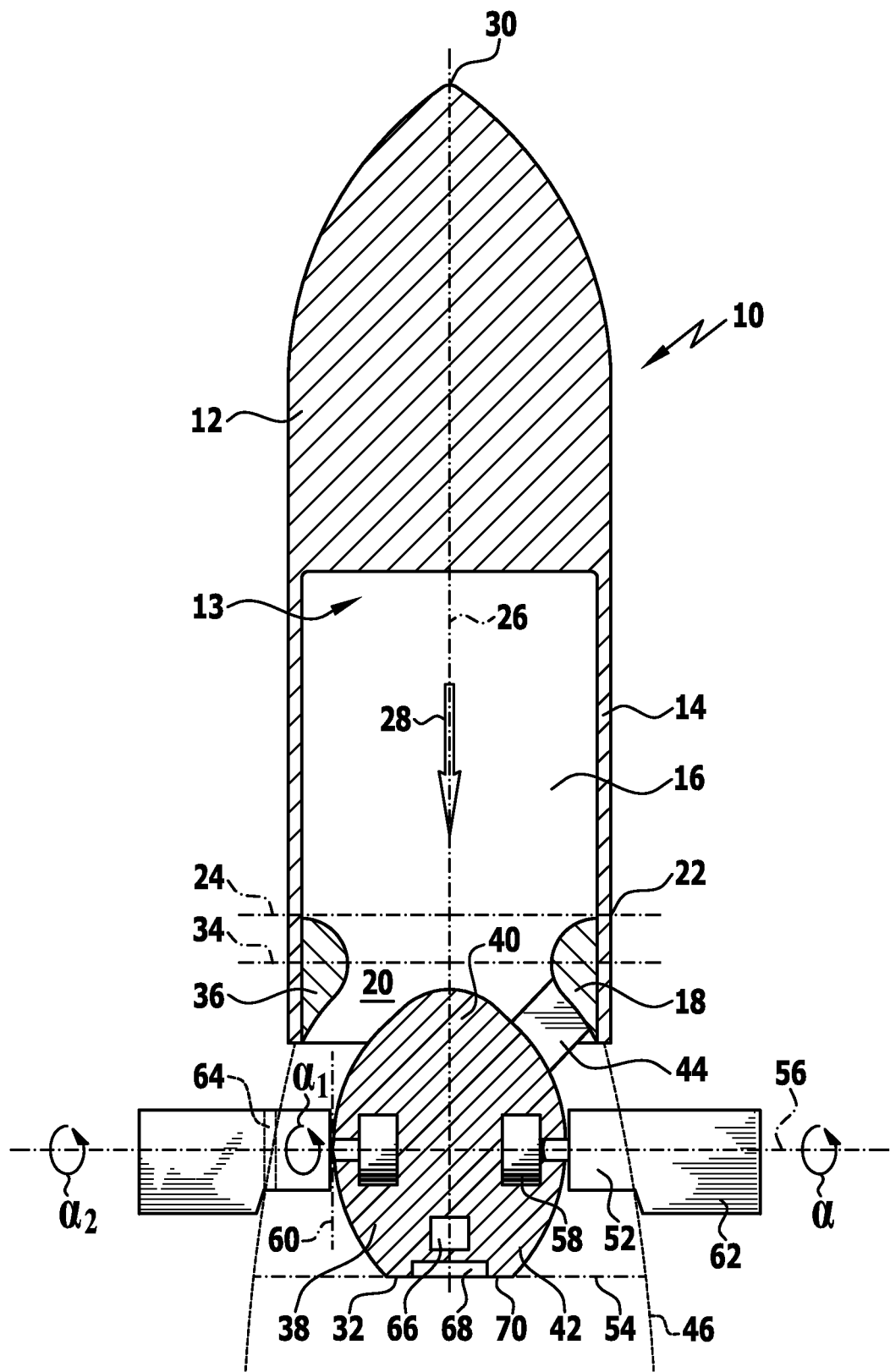
FIG. 1 is a schematic representation of an exemplary embodiment of a flying object in accordance with the invention.

An exemplary embodiment of a flying object in accordance with the invention is a rocket which is shown schematically in FIG. 1 and indicated therein by 10. The rocket 10 comprises a casing structure 12 within which an engine 13 is arranged.

The engine 13 comprises a combustion chamber 14 with a combustion space 16 as well as a feeding device for feeding fuel and oxidizer into the combustion space 16 (not shown in FIG. 1). Arranged within the casing structure 12 are a storage device for fuel and, if required, a storage device for the oxidizer (not shown in FIG. 1).

The engine 13 can, for example, be a solid engine, which is based on a solid fuel, a liquid engine, which is based on a liquid fuel, or a gel-type propulsion device, which is based on a gel-like fuel. It can also be a hybrid engine, which uses a combination of at least two of the solid, liquid and gel-like fuel types. Other types of engines are also possible.

The combustion chamber 14 is followed by a nozzle 18.

Here, the combustion chamber 14 is defined such that the nozzle 18 begins in a region 22 in which the combustion space 16 converges. The transition between the combustion chamber 14 and the nozzle 18 therefore lies in a plane 24 which is vertical to an axis 26 of the flying object 10. A cross-section of a hollow space within the casing structure 12 first converges in a direction 28 pointing from a tip 30 towards a rear portion 32 of the flying object 10. Above the plane 24, towards the tip 30, is the combustion chamber 14 with the combustion space 16, and beneath this plane 24, towards the rear portion 32, is the nozzle 18 with its nozzle space 20.

Preferably, the configuration of the combustion space 16 is radially symmetric about the axis 26.

Preferably, the configuration of the nozzle space 20 is also radially symmetric about the axis 26.

Starting from the plane 24, the cross-section of the nozzle space 20 of the nozzle 18 first converges down to a narrowest cross-section at a plane 34 and then diverges in the direction of the rear portion 32.

Arranged at the casing structure 12 is an in particular annular convergence-divergence device 36 by which the correspondingly configured nozzle space 20 is defined.

The nozzle 18 comprises a (single) centre body 38 around which combustion gases from the combustion space 16 can flow. The centre body 38 is outside of the combustion space 16, in the nozzle space 20. The centre body 38 has a first portion 40 protruding into the nozzle space 20 and a second portion 42 positioned outside of the nozzle space 20, in the outer space.

In particular, the centre body 38 is held at the convergence-divergence device 36 via a plurality of holding bridges 44 and is therefore also fixed relative to the casing structure 12. The holding bridges 44 are configured such that combustion gases can flow past them.

Indicated in FIG. 1 by the broken lines is a media boundary 46 which indicates the boundary region of the emanating combustion gases. This media boundary 46 is determined by the configuration of the nozzle 18 and also by the instantaneously prevailing pressure ratios.

In an exemplary embodiment, the nozzle 18 with centre body 38 is configured as a plug nozzle. A plug nozzle is pressure ratio-adaptive in terms of the ratio of a combustion chamber pressure $p_c$ to an external pressure $p_a$.

As a flying object ascends into the atmosphere, the external pressure decreases with altitude. With space transport systems in the civil field, a primary aim is to adapt and optimize the specific thrust of the engine 13—and thus the performance of the nozzle—for the instantaneous flight altitude during the ascent. This is also referred to as altitude adaptation. A pressure dependency-adaptive nozzle is also an altitude-adaptive nozzle.

With controllable engines, for example in the field of military technology, the primary aim is to adapt and optimize the specific thrust—and thus the performance of the nozzle—for the pressure ratio of combustion chamber pressure to external pressure.

Figure 2:
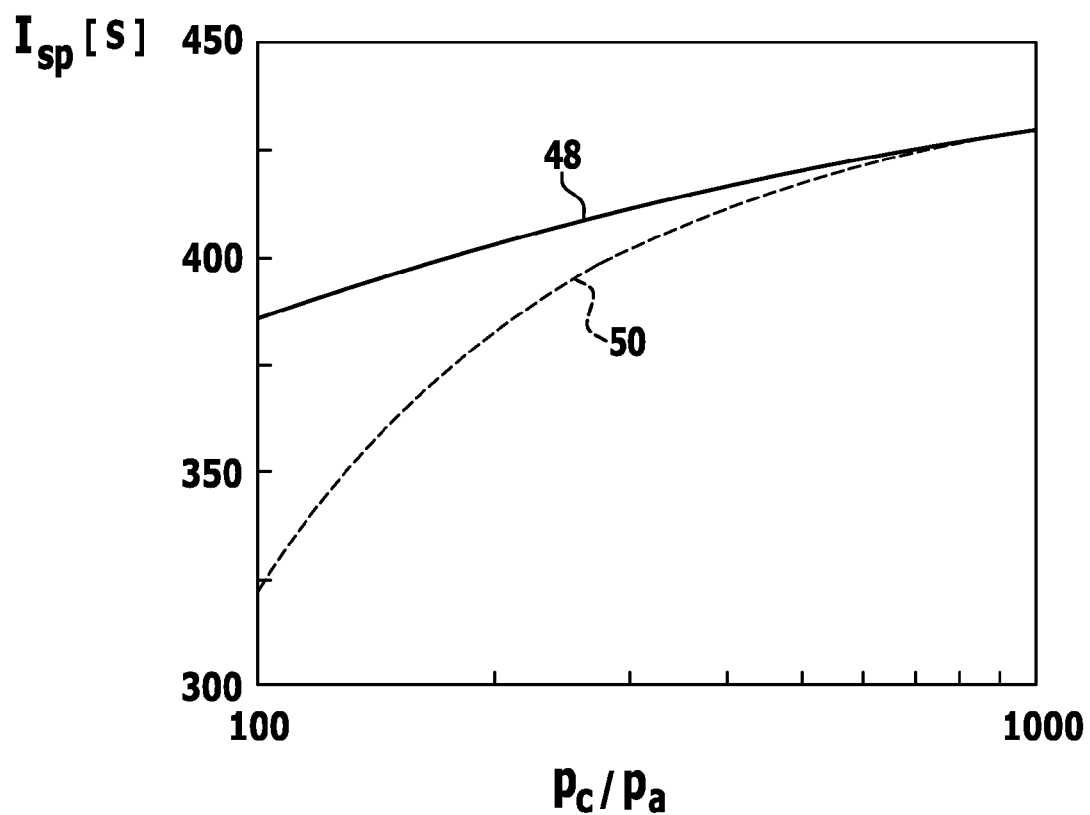
FIG. 2 is a diagram showing the course of the specific impulse $I_{sp}$ as a function of the ratio of a combustion chamber pressure $p_c$ to an external pressure $p_a$ with two different nozzle types.

FIG. 2 schematically shows with curve 48 the course of the specific impulse as a function of the ratio of combustion chamber pressure $p_c$ to external pressure $p_a$ for a plug nozzle exemplified by a LOX-LH2 engine of the Vulcain class at a combustion chamber pressure of 100 bar. The pressure ratio $p_c/p_a$ equal to 1,000 corresponds to a flight altitude of 15 km. In comparison, curve 50 shows the course of the specific impulse for a conventional bell-shaped nozzle. It can be seen that at low pressure ratios, i.e. at low external pressure, a notable impulse gain can be achieved by the use of a plug nozzle. For example, by the use of a plug nozzle, an increase in start thrust by about 12% can be achieved at the ratios in accordance with FIG. 2.

In particular, plug nozzles are implemented by the geometric configuration of the centre body 38. With respect to plug nozzles, reference is made to the article "Advanced Rocket Nozzles" by G. Hagemann et al. in Journal of Propulsion and Power, Vol. 14, No. 5, September-October 1998, pages 620-634 and, in particular, to pages 626 ff. and the citations there. These documents are incorporated herein and made a part hereof by reference. Plug nozzles are known per se.

As mentioned above, the centre body 38 is a centre body of a plug nozzle. As a result of the configuration of the nozzle space 20, it has combustion gases flowing around it in supersonic flow.

At the centre body 38 are at least three separate jet vanes 52, which are positioned in the flow field of the combustion gases. By using at least three jet vanes, thrust vector control can be carried out with respect to yaw, roll and pitch. Furthermore, it is also possible to carry out thrust magnitude control.

In a plug nozzle, which is an example of a pressure ratio-adaptive nozzle, control elements are integrated in the centre body. It is possible to achieve thrust vector control which is pressure ratio-adaptive in terms of both magnitude and direction. This allows an optimized performance to be implemented in terms of the ratio of combustion chamber pressure to external pressure. The position of the media boundary 46 adapts to the pressure ratio. The steady flow of the exhaust gas flow of the combustion gases around the jet vanes 52 is enabled over the entire pressure ratio range. At high pressure ratios, steering via the exhaust gas jet is possible. At small values of the pressure ratio, aerodynamic steering is possible. If the pressure ratio $p_c$ to $p_a$ increases, then the media boundary 46 expands outward. This increases an area exposed to the jet of a jet vane 52 in the exhaust gas jet. On the other hand, the vane area in the external flow, outside of the exhaust gas jet, decreases.

Preferably, the at least three jet vanes 52 are arranged in a region where the combustion gases have their highest impulse. This location depends upon the geometric configuration of the centre body 38.

The jet vanes 52 are positioned between the centre body 38 and the media boundary 46. By means of the jet vanes, the flow field can be influenced to allow thrust vector control of the flying object 10 to be carried out.

The at least three jet vanes 52 are arranged near to a nozzle end 54 of the nozzle 18 and are preferably arranged outside of the nozzle space 20. They influence the hot gas flow of the combustion gases as these exit. The nozzle end 54 is defined as the last cross-sectional surface that passes through a rear portion (denoted by 70 below) of the centre body 38.

In principle, the at least three jet vanes are exposed to hot combustion gases and also to corrosive and/or abrasive particles.

In an advantageous embodiment, the at least three jet vanes 52 are at least partially made of a carbide ceramic material. For example, they are made of a C—SiC material, which is a fibre-reinforced ceramic material with silicon carbide phase.

For example, the at least three jet vanes 52 are configured as described in DE 10 2004 037 487 A1, which is incorporated herein and made a part hereof by reference.

For controlled influencing of the hot gas flow of the combustion gases, at least one of the at least three jet vanes 52 is arranged for pivotal movement at the centre body 38. A pivot axis 56 lies transverse and, in particular, perpendicular to the axis 26 of the flying object 10.

For driving a pivotal movement, a drive device 58 is provided which is positioned within the centre body 38, protected from the hot gas flow.

Each jet vane 52 has a drive of its own associated with it in order to enable independent pivotability.

The corresponding drive device 58 is configured such that a specific pivoted position is lockable.

Supply lines for the drive devices 58 are passed through one or several holding bridges 44.

It is, in principle, possible for at least one of the jet vanes 52 to be foldable about an axis 60 which is, for example, parallel to the axis 26 of the flying object 10. This allows the outer dimensions to be reduced when the flying object 10 is not being operated. The folded position of a jet vane 52 is not an operative position. If a jet vane is in its folded position, then it is not in use.

In an advantageous embodiment, the respective jet vane 52 has an aerodynamic vane 62 fixed thereon which protrudes through the media boundary 46 into the outer space, in which an external air flow around the casing structure 12 exists. A jet vane 52 is exposed to the hot gas flow of combustion products within the media boundary 46. An aerodynamic vane 62 serves to control the flying object 10 aerodynamically. A jet vane 52 is used to carry out impulse control of the flying object 10 by influencing the hot gas flow of combustion gases.

A jet vane 52 with associated aerodynamic vane 62 are combined to form a unit.

By a pressure variation, the position of the media boundary 46 is shifted and thus the influence on the control of jet vane 52 and aerodynamic vane 62 can also be shifted. In principle, an adaptive directional control is thereby possible.

In an exemplary embodiment, an aerodynamic vane 62 is configured as a grid airfoil structure.

It is, in principle, possible for an aerodynamic vane 62 to be arranged in fixed manner at the associated jet vane 52. When the jet vane 52 pivots through an angle $\alpha$, the aerodynamic vane 62 pivots through the same angle concurrently with the jet vane.

As shown schematically in FIG. 1, it is also possible to allow a relative pivotability between the jet vane 52 and the associated aerodynamic vane 62. It is then possible, for example, for the jet vane 52 to be pivoted about pivot axis 56 through an angle $\alpha_1$ and for the associated aerodynamic vane to be pivoted through an angle $\alpha_2$ different from $\alpha_1$.

To this end, for example, a gear unit 64 can be provided via which, for example, the associated aerodynamic vane is held at the corresponding jet vane.

In an embodiment, a sensor device 66 is arranged at the centre body 38 which is, in particular, an optical sensor device. It is protected by means of a window 68, said window 68 allowing optical signals to penetrate through to the sensor device 66.

In particular, the sensor device 66 is arranged in a rear portion 70 of the centre body 38 which is farthest away from the combustion chamber 14. For example, the window 68 is coaxial with the axis 26, or the axis 26 penetrates the window 68. Preferably, the sensor device 66 is arranged centrally at the centre body 38 and, in particular, the axis 26 penetrates the sensor device 66.

For example, the sensor device 66 comprises one or more infrared and/or other optical sensors. Laser impingement can also be possible.

Communication with external systems is possible via the sensor device 66. The sensor device 66 can, for example, receive communication signals in the form of infrared rays or laser rays, for example, which are provided by a ground station or another flying object.

In the rear portion 70, the centre body 38 has combustion gases flowing around it. An analysis of these exhaust gases is possible by means of a corresponding sensor device. In particular, a flow analysis is possible. When such a sensor device is positioned in the rear portion 70, it is, for example, possible to measure a roll attitude-independent exhaust gas layer thickness. Furthermore, an independent positionability relative to positions of an exhaust gas jet and a control station is achieved.

The solution in accordance with the invention does not require the use of a blast tube. Generally, such a blast tube is exposed to high thermal and abrasive loads. As a blast tube need not be used with the solution in accordance with the invention, the corresponding engine 13 can be made shorter.

Figure 3:
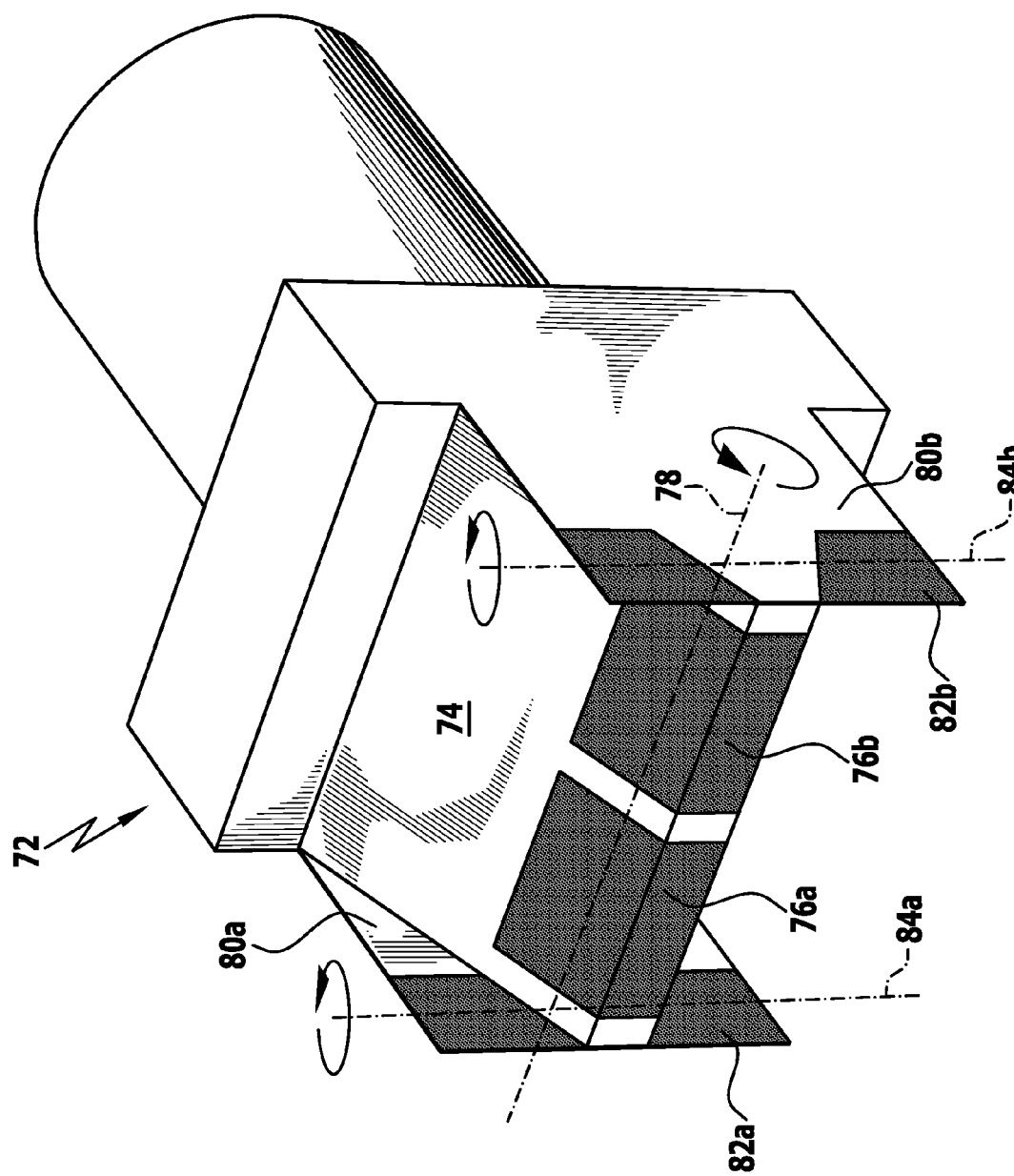
FIG. 3 is a schematic representation of an exemplary embodiment of a centre body of a linear plug nozzle.
Figure 4:
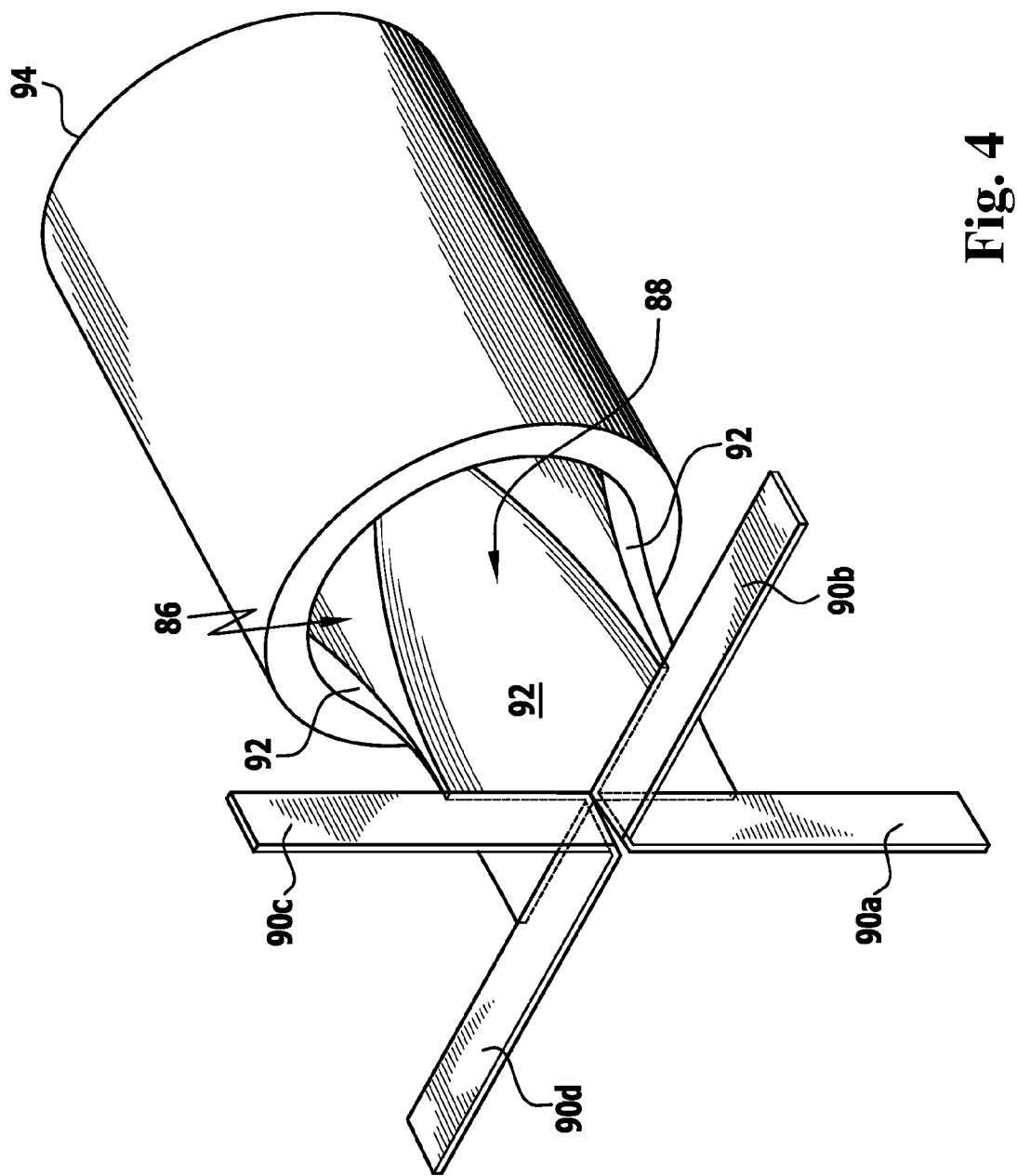
FIG. 4 illustrates a further exemplary embodiment of a plug nozzle.

FIG. 3 is a schematic representation of an exemplary embodiment of a centre body 72 of a linear plug nozzle. Such a linear plug nozzle is also referred to as a linear aerospike. This centre body 72 comprises a rear portion 74 at which jet vanes 76a, 76b are arranged. These can, in principle, be pivotable about a pivot axis 78.

The jet vanes 76a, 76b are pure jet vanes, i.e. they have no aerodynamic vanes arranged on them.

Arranged at the centre body 72 are side plates 80a, 80b. On these are units 82a, 82b made up of jet vane(s) and aerodynamic vanes. These units 82a, 82b are oriented transversely to the jet vanes 76a, 76b.

In principle, pivotability about axes 84a, 84b is possible, the pivot axes lying transverse and, in particular, perpendicular to the pivot axis 78.

In a further exemplary embodiment of a centre body 86 of a plug nozzle, a holding element 88 is provided on which there are, for example, four jet vanes 90a, 90b, 90c, 90d. The holding element 88 has, for example, four concave expansion surfaces 92 which serve to influence flow.

The jet vanes 90a, 90b, 90c, 90d can be positioned at a large distance from a front end 94 of the centre body 86. This allows the abrasive effect of the hot gas flow in the region of the leading edges of the jet vanes 90a, 90b, 90c, 90d to be reduced.

In principle, the jet vanes 90a, 90b, 90c, 90d can be foldable in order, for example, to reduce the space requirement in a launch container.

It is, in principle, also possible for the holding element 88 to be slidable in order to reduce this space requirement.

The invention claimed is:

1. Flying object comprising an engine, said engine comprising:
   a casing containing a hollow space that defines a combustion chamber with a combustion space and a nozzle with a nozzle space following the combustion chamber;
   wherein a transition between the combustion chamber and the nozzle lies in a plane in which a cross-section of the combustion space converges;
   a centre body adapted to have combustion products flowing around the centre body;
   wherein the centre body is at least partially arranged in the nozzle space, outside of the combustion space, and extends outwardly from the hollow space within the casing; and
   at least three jet vanes which are arranged at a portion of the centre body outside the hollow space within the casing.

2. Flying object in accordance with claim 1, wherein the nozzle with the centre body is a pressure ratio-adaptive nozzle with respect to the ratio of combustion chamber pressure to external pressure.

3. Flying object in accordance with claim 2, wherein the nozzle with centre body is configured as a plug nozzle.

4. Flying object in accordance with claim 1, wherein at least one of the at least three jet vanes is mounted for pivotal movement at the centre body.

5. Flying object in accordance with claim 4, wherein a drive device for a pivotal movement is positioned in the centre body.

6. Flying object in accordance with claim 1, wherein at least one of the at least three jet vanes is connected with an aerodynamic vane.

7. Flying object in accordance with claim 6, wherein the aerodynamic vane and the jet vane connected therewith form a unit.

8. Flying object in accordance with claim 6, wherein the associated aerodynamic vane is pivotable relative to the at least one jet vane.

9. Flying object in accordance with claim 8, wherein a gear device for the relative pivotability of the at least one jet vane and the aerodynamic vane connected therewith is provided.

10. Flying object in accordance with claim 1, wherein at least one holding bridge via which the centre body is held at a casing structure is provided.

11. Flying object in accordance with claim 10, wherein one or more conduits or lines leading to the centre body are arranged at the at least one holding bridge.

12. Flying object in accordance with claim 1, wherein a sensor device is arranged at the centre body.

13. Flying object in accordance with claim 12, wherein the sensor device is arranged in a rear portion of the centre body.

14. Flying object in accordance with claim 1, wherein at least one of the at least three jet vanes is foldably or slidably arranged at the centre body.

15. Flying object in accordance with claim 1, wherein the at least three jet vanes are arranged at the side or at the rear of the centre body.

16. Flying object in accordance with claim 1, wherein the jet vanes are at least partially made of a carbide ceramic material.

* * * * *